US012586856B2

(12) United States Patent
    Deng et al.

(10) Patent No.:  US 12,586,856 B2
(45) Date of Patent:      Mar. 24, 2026

(54) BATTERY CASE COMPRISING CONNECTED BEAM CONFIGURATION AND BATTERY DEVICE

(71) Applicant: CALB Co., Ltd., Jiangsu (CN)

(72) Inventors: Feng Deng, Changzhou (CN); Xinwei Jiang, Changzhou (CN)

(73) Assignee: CALB Co., Ltd., Jiangsu (CN)

( * ) Notice: Subject to any disclaimer, the term of this patent is extended or adjusted under 35 U.S.C. 154(b) by 755 days.

(21) Appl. No.: 17/985,144

(22) Filed: Nov. 10, 2022

(65) Prior Publication Data

US 2023/0327260 A1      Oct. 12, 2023

(30) Foreign Application Priority Data

Apr. 11, 2022    (CN) .......................... 202210372680.4

(51) Int. Cl.
    *H01M 50/244*        (2021.01)
    *H01M 50/289*        (2021.01)
(52) U.S. Cl.
    CPC ....... *H01M 50/244* (2021.01); *H01M 50/289* (2021.01)
(58) Field of Classification Search
    CPC ................................................... H01M 50/289
    See application file for complete search history.

(56) References Cited

U.S. PATENT DOCUMENTS

| | | | | |
|---|---|---|---|---|
| 2008/0118823 A1* | 5/2008 | Yang | ................... | H01M 50/209 |
| | | | | 429/100 |
| 2017/0355255 A1 | 12/2017 | Brausse et al. | | |
| 2021/0320368 A1* | 10/2021 | Huang | ................ | H01M 50/242 |
| 2022/0209346 A1 | 6/2022 | Yao et al. | | |

FOREIGN PATENT DOCUMENTS

| | | |
|---|---|---|
| CN | 108461685 | 8/2018 |
| CN | 214957111 | 11/2021 |
| CN | 217334262 | 8/2022 |
| EP | 3886198 | 9/2021 |
| EP | 4044329 | 8/2022 |

OTHER PUBLICATIONS

"Office Action of China Counterpart Application", issued on Jun. 27, 2025, p. 1-p. 9.
"Search Report of Europe Counterpart Application", issued on Sep. 29, 2023, p. 1-p. 9.
"Examination report of India Counterpart Application", issued on Jan. 6, 2026, p. 1-p. 6.

* cited by examiner

*Primary Examiner* — Maria Laios
*Assistant Examiner* — Jordan E Berresford
(74) *Attorney, Agent, or Firm* — JCIP GLOBAL INC.

(57)            ABSTRACT

The invention discloses a battery case and a battery device. An intermediate beam is connected to at least one side beam by a connecting piece, and a first groove is disposed on a side beam corresponding to a reference end. After the connecting piece is accommodated in the first groove, the intermediate beam and the corresponding side beam can be fixed and connected. Accordingly, the effective connection between the intermediate beam and the side beams is implemented, damage to the intermediate beam and the side beams in the connection process is prevented, and meanwhile the effects of the connection on the single batteries can be prevented, thereby improving the reliability of the battery device.

10 Claims, 9 Drawing Sheets

31

BATTERY CASE COMPRISING CONNECTED BEAM CONFIGURATION AND BATTERY DEVICE

CROSS-REFERENCE TO RELATED APPLICATION

This application claims the priority benefit of China application no. 202210372680.4, filed on Apr. 11, 2022. The entirety of the above-mentioned patent application is hereby incorporated by reference herein and made a part of this specification.

BACKGROUND

Technology Field

The invention relates to the technical field of batteries, and particularly, to a battery case and a battery device.

Description of Related Art

Various beams and batteries can be included in a battery pack. By connecting the beams, a battery case can be formed, thereby facilitating the fixing of the batteries. Therefore, how to implement the connection among beams is an urgent technical problem to be solved by those skilled in the art.

SUMMARY

In the embodiments of the invention, a battery case and a battery device are provided, which are configured to implement the connection among beams.

For a first aspect, in the embodiments of the invention, a battery case is provided. The battery case includes a frame and an intermediate beam. The intermediate beam is located between two side beams disposed opposite to each other in the frame.

A connecting piece is disposed on at least one end of the intermediate beam. The connecting piece fixes the intermediate beam and at least one of the side beams. The connecting piece, the intermediate beam, and the side beams are disposed apart from one another.

An end where the connecting piece is disposed is a reference end, a first groove is disposed on the side beam corresponding to the reference end, and at least part of the connecting piece is disposed in the first groove.

Accordingly, the intermediate beam and the at least one side beam are connected by the connecting piece, and the first groove is disposed on the side beam corresponding to the reference end. After the connecting piece is accommodated in the first groove, the intermediate beam and the corresponding side beam can be fixed and connected.

For a second aspect, in the embodiments of the invention, a battery device is provided. The battery device includes the battery case provided by the embodiments of the invention, and single batteries located in the battery case.

Accordingly, the intermediate beam and the at least one side beam are connected by the connecting piece, and the first groove is disposed on the side beam corresponding to the reference end. After the connecting piece is accommodated in the first groove, the intermediate beam and the corresponding side beam can be fixed and connected.

DESCRIPTION OF THE EMBODIMENTS

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

In particular, a reference to "the" object or "a" and "an" object is intended to denote also one of a possible plurality of such objects. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

Further, in the description of the present disclosure, it should be understood that spatially relative terms, such as "above", "below" "inside", "outside" and the like, are described based on orientations illustrated in the figures, but are not intended to limit the exemplary embodiments of the present disclosure.

In the context, it should also be understood that when an element or features is provided "outside" or "inside" of another element(s), it can be directly provided "outside" or "inside" of the other element, or be indirectly provided "outside" or "inside" of the another element(s) by an intermediate element.

Figure 1:
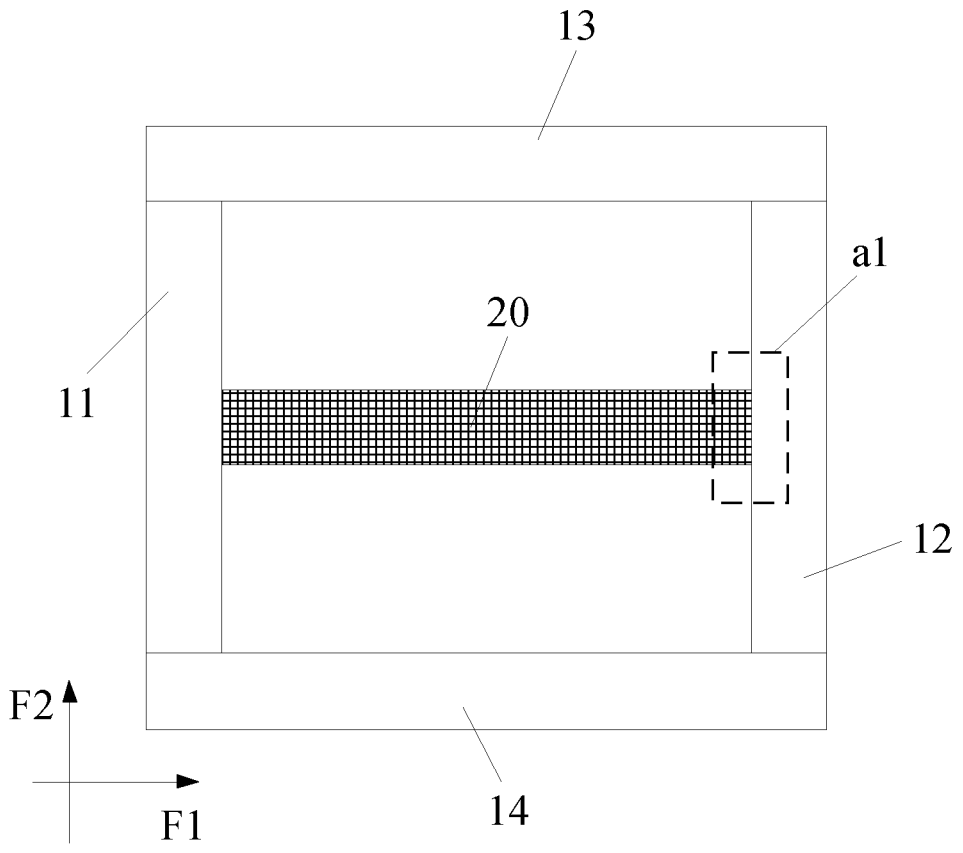
FIG. 1 is a schematic view of a structure of a battery case provided in an embodiment of the invention.

In an embodiment of the invention, a battery case is provided, as shown in FIG. 1. The battery case may include a frame and an intermediate beam 20, and the intermediate beam is located between two opposite side beams (the structures with the reference numerals 11 and 12 as shown) in the frame.

Figure 2:
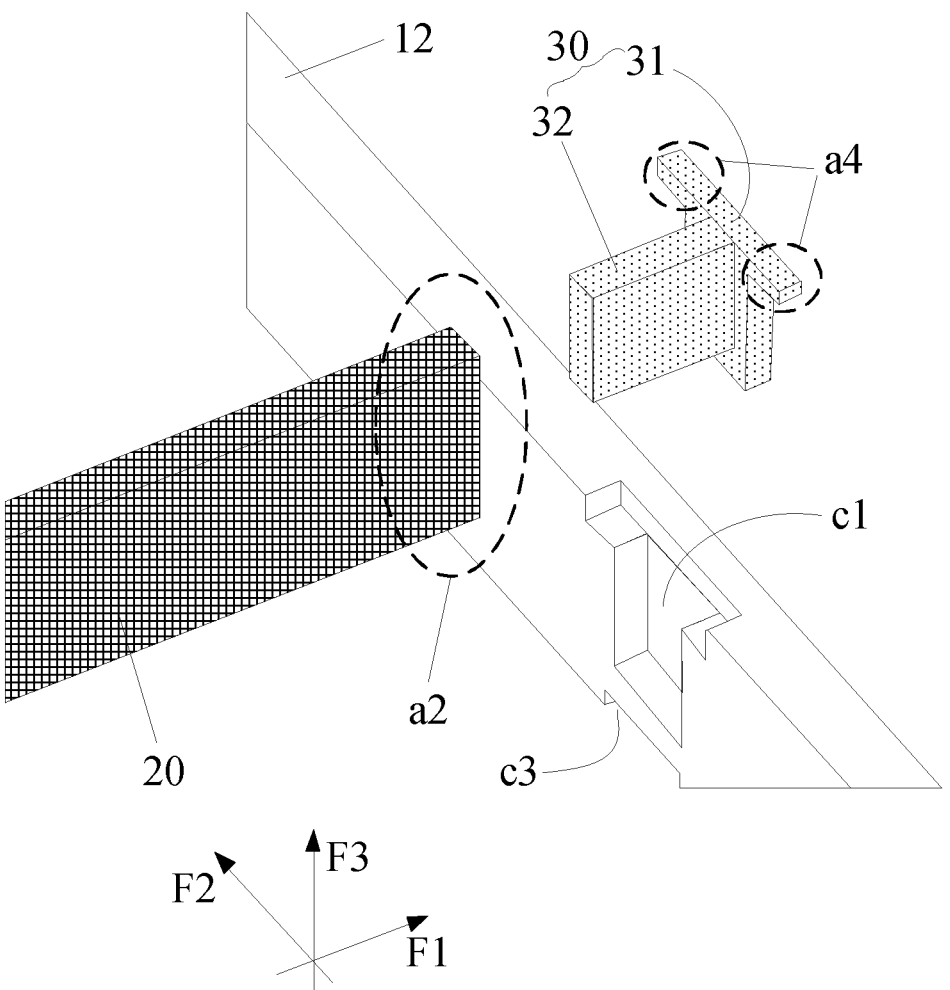
FIG. 2 is a schematic view illustrating the enlarged dotted circle a1 in FIG. 1.

As shown in FIG. 2, a connecting piece 30 is disposed on at least one end of the intermediate beam 20, and the connecting piece 30 fixes the intermediate beam 20 and at least one side beam (the reference numeral 12 in FIG. 2 is illustrated as an example). The connecting piece 30, the intermediate beam 20, and a side beam 12 are disposed apart from one another.

The end where the connecting piece 30 is disposed is a reference end (the end shown in the dotted circle a2 in FIG. 2), and a first groove c1 is disposed on the side beam 12 corresponding to the reference end. At least part of the connecting piece 30 is disposed in the first groove c1.

As shown in FIG. 1, the intermediate beam 20 has a left end portion and a right end portion. In some embodiments, the configuration thereof can be illustrated as follows.

The left end portion of the intermediate beam 20 and the left side beam (illustrated as the reference numeral 11) are fixed by the connecting piece 30, and the right end portion of the intermediate beam 20 and the right side beam (illustrated as the reference numeral 12) can be fixed by other means (for example but not limited to, by direct screwing, by gluing, or the like).

Alternatively, the right end portion of the intermediate beam 20 and the right side beam 12 are fixed by the connecting piece 30, and the left end portion of the intermediate beam 20 and the left side beam 11 can be fixed by other means (for example but not limited to, by direct screwing, by gluing, or the like).

Alternatively, the left end portion of the intermediate beam 20 and the left side beam 11 are fixed by the connecting piece 30, and the right end portion of the intermediate beam 20 and the right side beam 12 are fixed by the connecting piece 30.

The fixture between which end portion of the intermediate beam 20 and which side beam by using the connecting piece 30 can be configured according to actual requirements, which is not limited to the invention.

Accordingly, the intermediate beam and at least one side beam are connected by the connecting piece, and a first groove is disposed on the side beam corresponding to the reference end. After the connecting piece is accommodated in the first groove, the intermediate beam and the corresponding side beam can be fixed and connected (as the schematic view shown in FIG. 3, after the connection is completed, the intermediate beam 20 and the side beam 12 are connected by the connecting piece 30), and therefore the effective connection between the intermediate beam and the side beam is implemented, and the damage to the intermediate beam and the side beam in the connection process is prevented.

In addition, the connecting piece, the intermediate beam, and the side beams are disposed apart from one another, so the connecting piece, the intermediate beam, and the side beam are three independent elements, which can facilitate the assembly and disassembly of the intermediate beam and the side beam, contribute to more flexible assembly, and facilitate the maintenance and improvement for future use.

In addition, specifically, the assembly process may include, but not limited to, steps as follows. First, the connecting piece is assembled on the end of the intermediate beam to form a part A, next the connecting piece in the part A is accommodated into the first groove of the side beam to implement the assembly of part A and the side beam, and finally the assembly of the intermediate beam and the side beam is implemented.

In the assembly process, the connecting piece can function not only in connection and fixation but also in positioning with the side beam during assembly as well as in position limiting to a certain extent, thereby improving the assembly precision and efficiency.

In some embodiments, as shown in FIG. 1, in addition to two side beams (e.g. side beams 11 and 12), the frame may also include a first side beam 13 and a second side beam 14. The frame can be formed by the two side beams (e.g., side beams 11 and 12), and the first side beam 13 and the second side beam 14 for configuring some structures (for example, but not limited to, single batteries, conductive bars, wire harnesses, other devices, or the like) to implement the functions of the battery device in the frame. The frame can protect the structures from external impact and damage, thereby ensuring that the structures can function normally.

Figure 4:
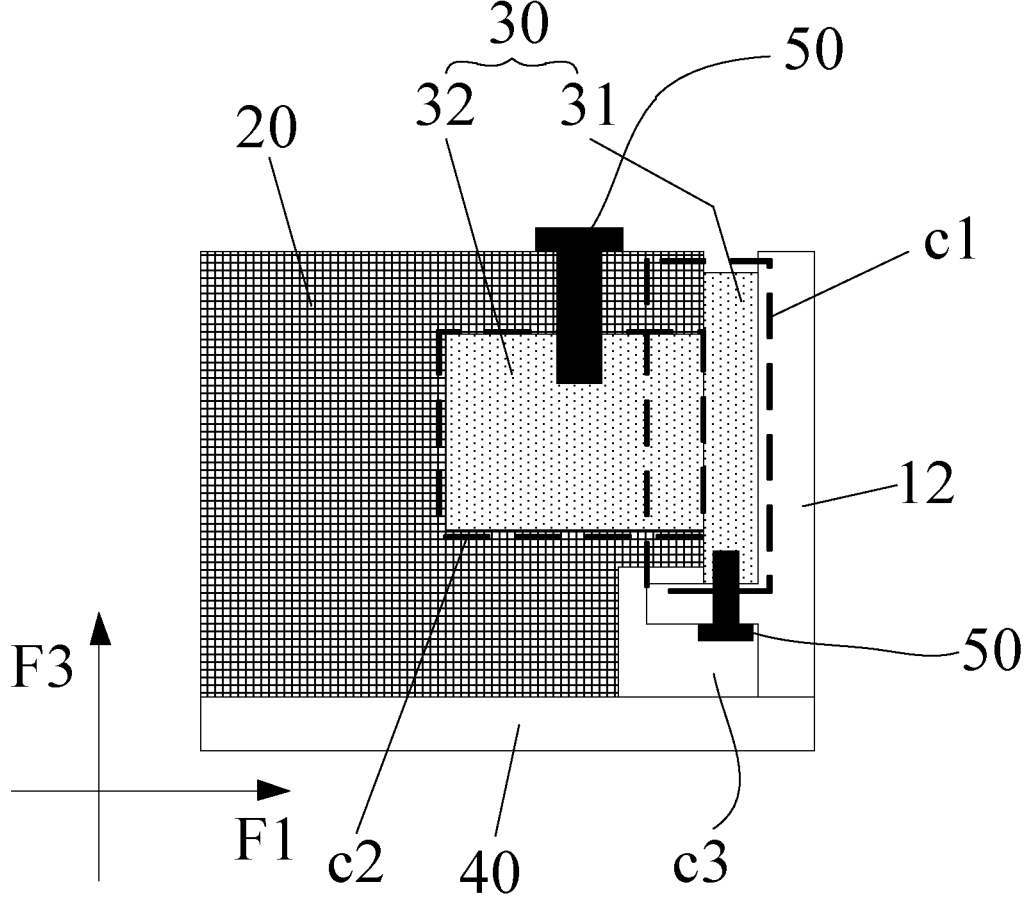
FIG. 4 is a schematic view of a connection mode of an connecting piece and an intermediate beam provided in an embodiment of the invention.

In some embodiments, as shown in FIG. 4, the connecting piece 30 includes a substrate 31 and a protrusion 32 protruding from the surface of the substrate 31.

The reference end (part of the intermediate beam 20 shown in FIG. 4 can be regarded as the reference end) has a second groove c2, and the protrusion 32 is disposed in the second groove c2.

At least part of the substrate 31 is disposed in the first groove c1.

That is, the connecting piece and the intermediate beam are not integrally formed but are processed separately. After being separately processed, the connecting piece and the intermediate beam are spliced together.

In the assembly process, first, the protrusion in the connecting piece can be inserted into the second groove of the intermediate beam to implement the connection between the connecting piece and the intermediate beam. Next, at least part of the substrate in the connecting piece is disposed in the first groove to implement the connection between the connecting piece and the side beam to implement the connection between the intermediate beam and the side beam through the connecting piece.

The protrusion in the connecting piece can be hidden in the intermediate beam, and at least part of the substrate can be hidden in the side beam, so such a configuration can contribute to reducing the impact on other surrounding structures (for example, but not limited to, single batteries) when the intermediate beam and the side beam are connected, thereby further contributing to the improvement of the energy density of the battery device while ensuring the normal assembly of other structures.

In some embodiments, as shown in FIG. 4, all the substrates 31 are disposed in the first groove c1.

Accordingly, the substrate can be completely hidden in the side beam, so that the connecting piece can be completely hidden in the intermediate beam and the side beam, which prevents impacts on the assembly of other structures and ensures the normal assembly of other structures.

In some embodiments, the substrate may also be partially disposed in the first groove, not shown in the drawings, to meet the requirements in different application scenarios and improve the design flexibility.

In some embodiments, as shown in FIG. 4, the intermediate beam 20 and the protrusion 32 are fixed by fasteners 50.

Accordingly, on the one hand, fixing the intermediate beam and the protrusion by the fastener can facilitate the assembly of the intermediate beam and the protrusion, improve the operability of the assembly, improve the connection strength of the intermediate beam and the protrusion as well, and increase the connection stability.

On the other hand, fixing the intermediate beam and the protrusion by the fastener can prevent damage to the intermediate beam when the intermediate beam is fixed by welding, thereby preventing adverse effects on the surrounding structures when the intermediate beam is damaged.

In some embodiments, a bottom plate for carrying the frame is further disposed.

Figure 5:
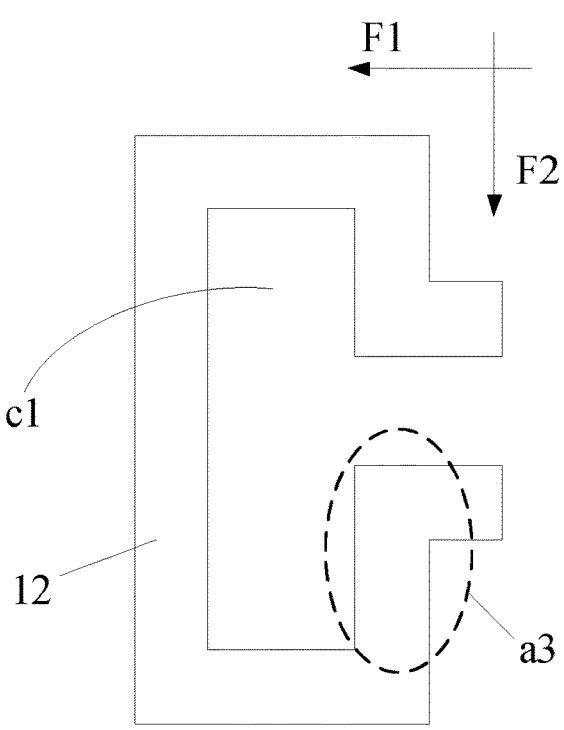
FIG. 5 is a schematic view of a first groove provided in an embodiment of the invention.
Figure 6:
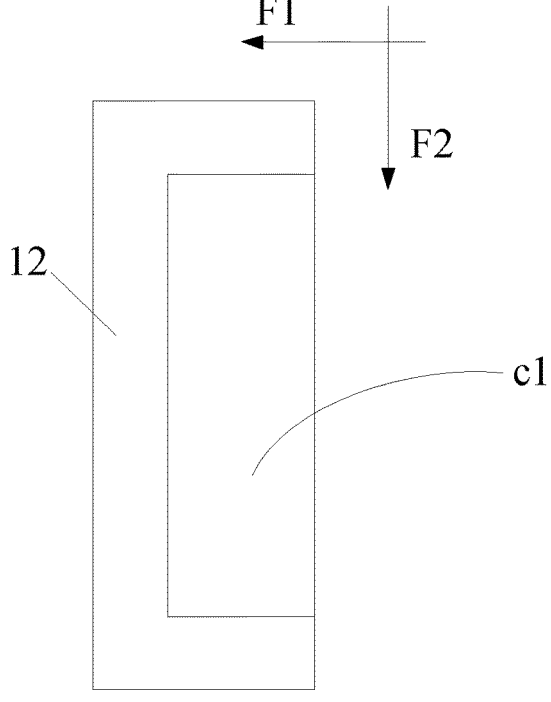
FIG. 6 is a schematic view of another first groove provided in an embodiment of the invention.

The contour of the orthographic projection of the first groove c1 on the bottom plate is T-shaped (as shown in FIG. 5), polygonal (as shown in FIG. 6), semi-elliptical (not shown), or semi-circular (not shown).

Accordingly, by the contour configuration of the orthographic projection of the first groove on the bottom plate, the assembly method of the intermediate beam and the side beam can be adjusted to meet the requirements in different application scenarios and improve the design flexibility.

Specifically, the assembly method can include steps as follows.

First, as shown in FIG. 5, an example in which the contour of the orthographic projection of the first groove c1 on the bottom plate is T-shaped is illustrated.

The assembly method of the part A (i.e., the part formed by the intermediate beam and the connecting piece when the protrusion in the connecting piece mentioned above is inserted into the second groove) and the side beams is as follows.

The substrate in the part A can be inserted into the first groove c1 along the direction perpendicular to the surface of the bottom plate (i.e., the direction perpendicular to the paper surface in FIG. 5, and this direction can also be interpreted as the F3 direction in FIG. 2), and the part A and the side beam 12 are fixed.

The contour of the orthographic projection of the first groove c1 is T-shaped, and the part shown in the dotted circle a3 can form a clamping position, so the substrate can be fixed in the first groove c1 to implement the fixation of the intermediate beam and the corresponding side beam 12 through a connecting piece.

Accordingly, as long as the substrate is inserted into the first groove, the fixation of the substrate can be implemented, thereby implementing the fixation of the intermediate beam and the corresponding side beam, facilitating the operation process, improving the assembly efficiency, and facilitating the assembly process as well.

Second, as shown in FIG. 6, an example in which the contour of the orthographic projection of the first groove c1 is polygonal is illustrated.

The assembly method of the part A and the side beam can be as follows.

The substrate in the part A can be pushed into the first groove c1 along the surface parallel to the bottom plate and perpendicular to the arrangement direction of the two side beams (i.e., the F1 direction shown in FIG. 6), so that the part A and the side beams 12 are fixed.

Accordingly, as long as the substrate is pushed into the first groove and the substrate is accommodated by the first groove, the fixation of the substrate can be implemented, thereby implementing the fixation of the intermediate beam and the corresponding side beam, facilitating the operation process, and improving the assembly efficiency.

Figure 3:
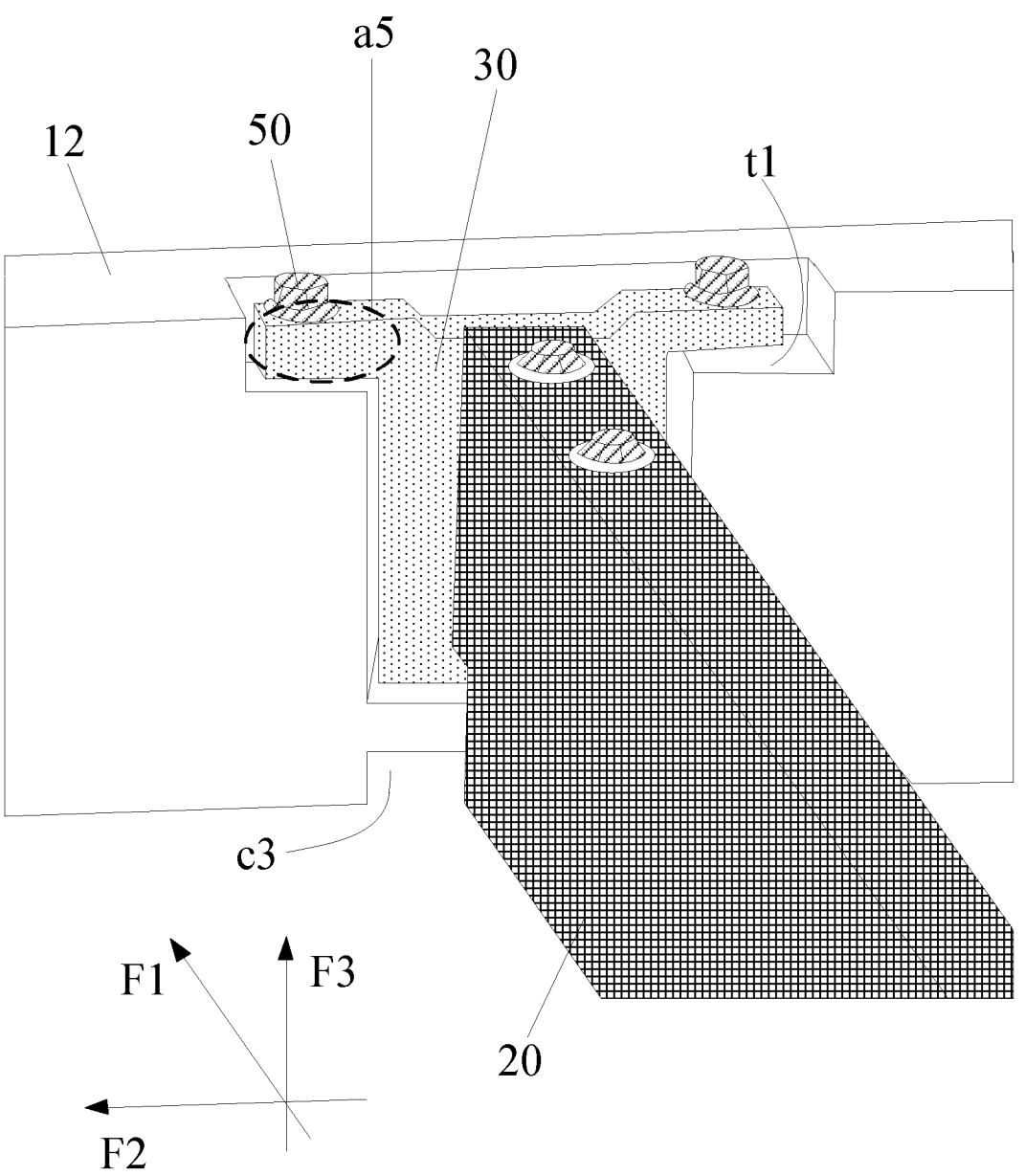
FIG. 3 is a schematic view illustrating the enlarged dotted circle a1 in FIG. 1 from another perspective.

In some embodiments, as shown in FIG. 2, the substrate 31 includes a body (i.e., the part of the substrate 31 shown in FIG. 2 and not circled by the dotted circle a4) and an overlapping portion (as shown in the dotted circle a4 in FIG. 2) connected to each other. The protrusion 32 protrudes from the surface of the body;

As shown in FIG. 3, a step t1 is disposed in the first groove c1, and the overlapping portion (as shown in the dotted circle a5 in FIG. 3) overlaps the step t1 and is fixed by the fastener 50.

The fastener may include, but are not limited to, bolts, screws, studs, or the like. As long as the fastener can implement the fastening of the two structures, the fastener belongs to the protection scope of the embodiments of the invention.

In addition, the quantity and the position of the steps t1 are not limited to what is shown in FIG. 3 and may be set according to actual requirements, which is not limited to the invention. The example shown in FIG. 3 is only for illustration but not for limiting the invention.

Meanwhile, the relative configuration positions of the overlapping portion and the body are not limited to what is shown in FIG. 2 and can be specifically configured according to actual requirements, which is not limited to the invention. The example shown in FIG. 2 is only for illustration but not for limiting the invention.

In addition, note that the quantity and the position of the fasteners configured are required to be set according to factors, such as the configuration position and method of the step, which are not limited to the invention.

Accordingly, with the configuration of the step and the fastener, the overlapping portion can be stably fixed on the step in the first groove, which increases the connection area between the connecting piece and the side beam, and the shifting of the connecting piece is prevented, thereby effectively improving the fixing strength and the fixing effect of the intermediate beam and the side beam.

Moreover, fixing by the fastener can prevent the damage to the side beam when the side beam is fixed by welding, and the original structure of the side beam can be better maintained, thereby preventing adverse effects on the function of the side beam itself, and improving the reliability of the battery case.

In some embodiments, as shown in FIG. 2, two overlapping portions are disposed.

The body has opposite sides disposed along the extension direction of the side beam 12 (the F2 direction as shown in FIG. 2), and the two overlapping portions are located on the opposite sides, respectively.

Note that when the two overlapping portions are disposed on opposite sides (i.e., the left side and the right side shown in FIG. 2) of the body along the F2 direction in FIG. 2, the two overlapping portions may be illustrated as follows.

The two overlapping portions can be symmetrically (as shown in FIG. 2) or asymmetrically (not shown) configured.

Figure 7:
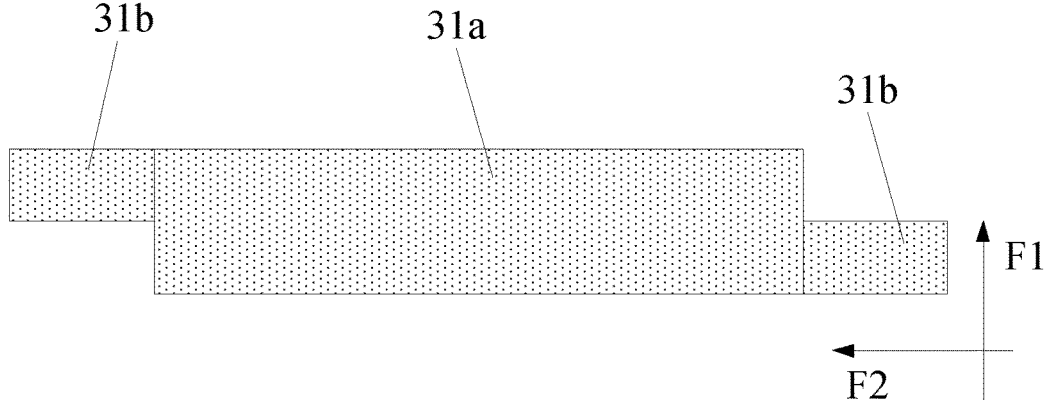
FIG. 7 is a schematic view of the configuration positions of a body and an overlapping portion provided in the embodiment of the invention.

In addition, there is a certain dislocation of the two overlapping portions along the F1 direction in FIG. 2, as shown in FIG. 7. The reference numeral 31b represents the overlapping portion, and the reference numeral 31a represents the body.

That is, the specific configuration positions of the two overlapping portions are not limited to those shown in FIG. 2 and FIG. 7 and may be configured according to actual requirements to meet the requirements in different application scenarios and improve the design flexibility.

Accordingly, on the one hand, the substrate can be stably overlapped on the step in the first groove through the two overlapping portions, which facilitates the assembly and fixation of the substrate and even the assembly and fixation of the connecting piece, and further secures the connection between the substrate and the side beam as well. On the other hand, when the intermediate beam and the protrusion are fixed by fasteners, the stress is concentrated, and with the two overlapping portions, the force is allowed to be distributed more evenly, which prevents stress concentration and damage to the substrate (even to the connecting piece) and the side beam.

In some embodiments, as shown in FIG. 2 to FIG. 4, a bottom plate 40 for carrying the frame is further disposed, and the first groove c1 is located on a side of the side beam 12 away from the bottom plate 40.

A third groove c3 is disposed on the side beam 12 corresponding to the reference end, and the third groove c3 is located on a side of the side beam 12 facing the bottom plate 40.

The fasteners 50 for fixing the side beam 12 and the connecting piece 30 are disposed in the third groove c3.

Note that the bottom plate is not shown in FIG. 2 and FIG. 3. However, in the drawings, the upper part of the side beam 12 can be regarded as the side away from the bottom plate, and the lower part of the side beam 12 can be regarded as the side facing the bottom plate.

With reference to FIG. 4, the fasteners 50 can be disposed in the third groove c3, and the bottom (i.e., the side of the connecting piece 30 facing the bottom plate 40) of the connecting piece 30 and the side beam 12 are connected through the fasteners 50.

The number of fasteners disposed in the third groove may be one, two, three or more, which may be specifically set according to actual requirements, which is not limited to the invention.

Accordingly, through the third groove, the bottom of the connecting piece and the side beam can be fixed, and meanwhile the fastener can be hidden in the third groove to prevent the effect of the configuration of the fastener on the assembly of other surrounding structures. In addition, when a fastener is further disposed on the top of the connecting piece, the connecting piece can be double-fixed from the top and the bottom, which further improves the connection stability between the connecting piece and the side beam, thereby further improving the connection stability between the intermediate beam and the side beam.

Figure 8:
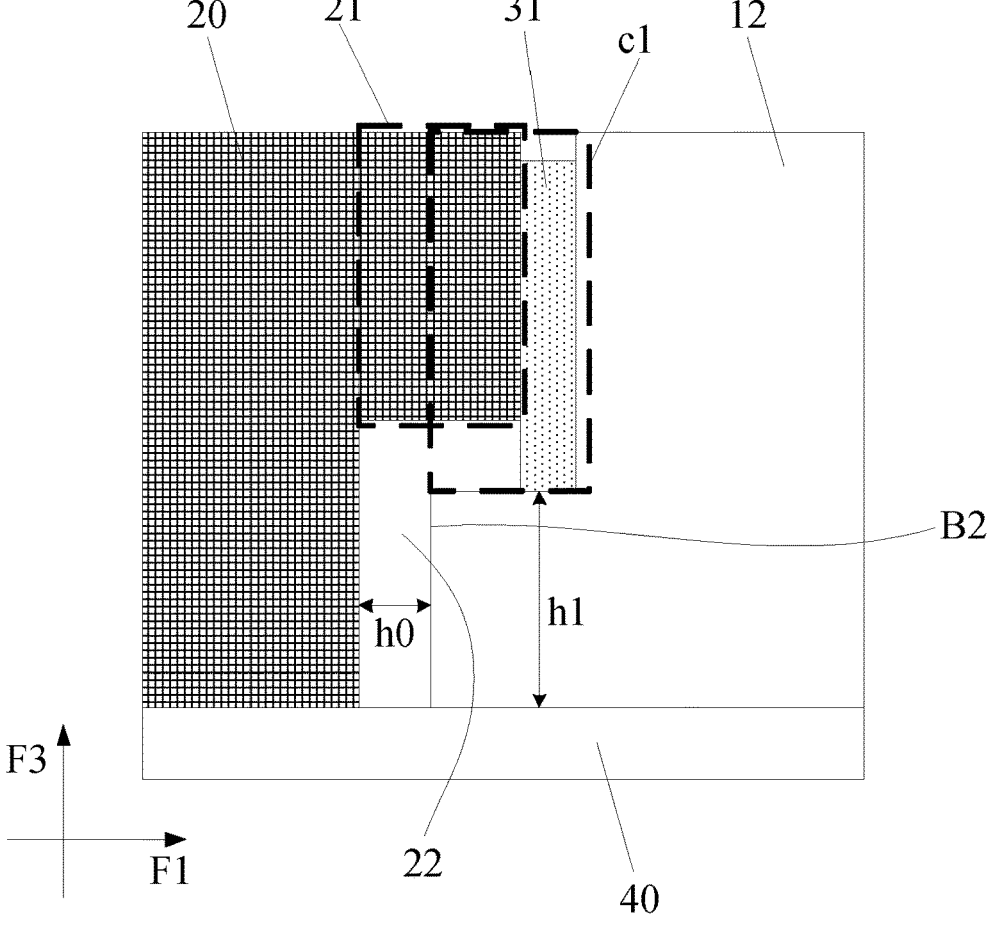
FIG. 8 is a schematic view of a notch structure and a non-notch structure provided in an embodiment of the invention.
Figure 9:
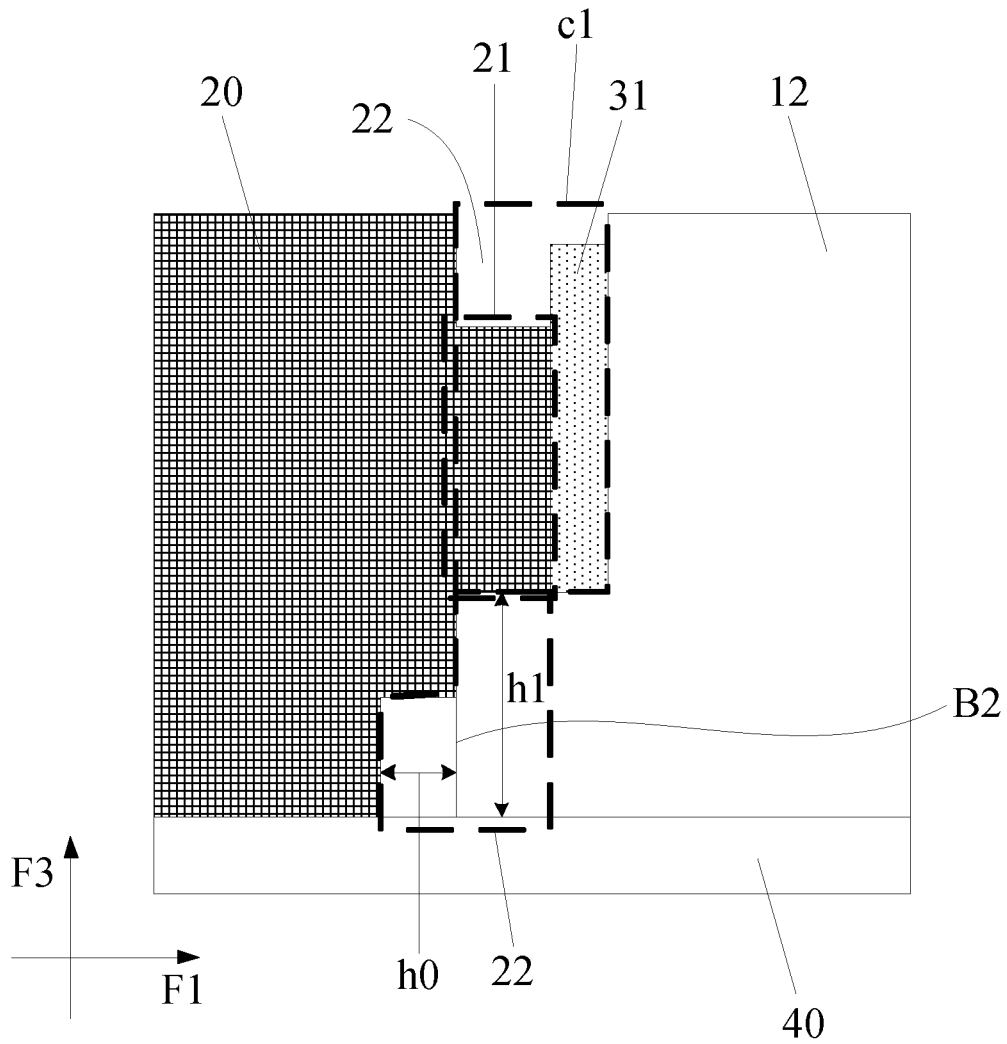
FIG. 9 is a schematic view of a notch structure and a non-notch structure provided in an embodiment of the invention.

In some embodiments, as shown in FIG. 8 and FIG. 9, the first surface (the right side surface of the reference end as shown in the drawings) of the reference end (part of the intermediate beam 20 shown in FIG. 8 and FIG. 9 can be regarded as the reference end) facing the side beam 12 includes a notch structure 22 and a non-notch structure 21 formed by the portion excluding the notch structure 22.

Figure 10:
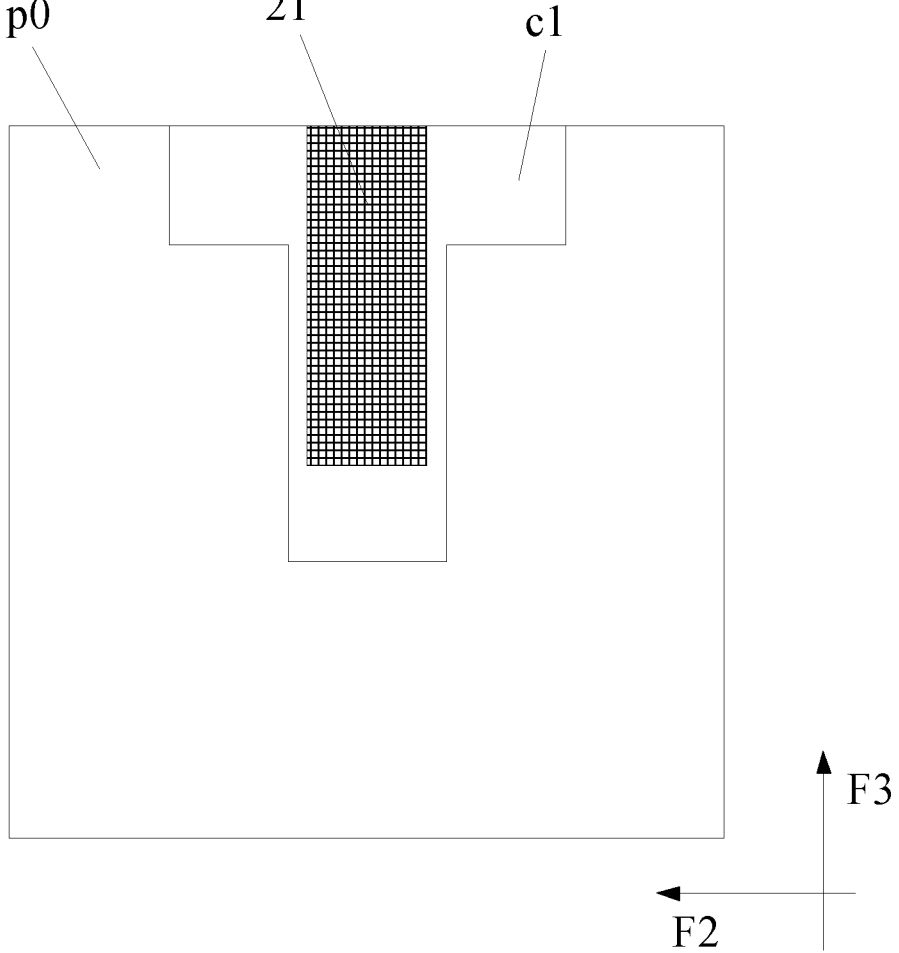
FIG. 10 is a schematic view illustrating the relationship between the orthographic projection of a first groove and the orthographic projection of a non-notch structure provided in an embodiment of the invention.

As shown in FIG. 10, the structure shown in FIG. 10 corresponds to the structure shown in FIG. 8. On a plane (i.e., the plane p0 shown in the drawing) perpendicular to the arrangement direction of the intermediate beam and the side beam, the orthographic projection of the non-notch structure 21 is located in the orthographic projection of the first groove c1.

As shown in FIG. 8 and FIG. 9, the connecting piece includes the substrate 31, and the substrate 31 is entirely disposed in the first groove c1. At least part of the non-notch structure 21 is disposed in the first groove c1.

In FIG. 8, part of the non-notch structure 21 is located in the first groove c1. In FIG. 9, the entire non-notch structure 21 is located in the first groove c1.

Accordingly, when at least part of the non-notch structure is located in the first groove, the at least part of the non-notch structure can be inserted into the first groove, and while implementing the effective connection between the intermediate beam and the side beam, the assembly error caused by the connection between the intermediate beam and the side beam can also be rectified, thereby improving the operability of the assembly.

In some embodiments, as shown in FIG. 8 and FIG. 9, the bottom plate 40 for carrying the frame is further disposed.

There is the notch structure 22 between the non-notch structure 21 and the bottom plate 40.

The first groove c1 is located on a second surface B2 of the side beam 12 facing the intermediate beam 20, and there is a gap h0 between the notch structure 22 and the second surface B2.

As shown in FIG. 8 and FIG. 9, the first groove c1 is located on the second surface B2. When the second surface B2 is located on the left side of the side beam 12 in FIG. 8 and FIG. 9, the portion on the left side of the side beam 12 excluding the first groove c1 can be regarded as the second surface B2. Meanwhile, due to the viewing angle, the second surface B2 is a line segment in FIG. 8 and FIG. 9, and the line segment is represented by h1.

In addition, with reference to FIG. 8 and FIG. 9, when there is the notch structure 22 between the non-notch structure 21 and the bottom plate 40, the notch structure 22 can be disposed close to the bottom of the intermediate beam 20, which contributes to the gap h0 between the notch structure 22 and the second surface B2.

Such a configuration brings advantages as follows.

When the intermediate beam is configured to fix the single battery, glue can be applied between the intermediate beam and the single battery to implement the glue connection between the intermediate beam and the single battery. In the process, glue may overflow, and the overflowed glue can flow into the notch structure, so that the glue at the notch structure can improve the connection strength of the intermediate beam and the side beam and increase the connection stability between the intermediate beam and the side beam.

In the assembly process, the intermediate beam can be glued to the single batteries first, and then the bottom of the intermediate beam (the lower surface of the intermediate beam 20 as shown in FIG. 8 and FIG. 9) and the bottoms of the single batteries can be coated with the glue to be bonded to the bottom plate to implement the bonding of the intermediate beam, the single batteries, and the bottom plate. In the process, with the configuration of the notch structure, the glue between the intermediate beam and the single battery, the glue between the intermediate beam and the bottom plate, and the glue overflowing between the single battery and the bottom plate can be directed to other space, which prevents the accumulation of the overflowing glue between the bottom plate and the intermediate beam and/or between the bottom plate and the single battery, thereby preventing adverse effects on the overall bonding effect and improving the overall bonding strength.

Specifically, the configuration form of the notch structure may include a simple notch as shown in FIG. 8, a notch with a step as shown in FIG. 9, or the like, which are not limited to the invention. As long as the configuration form can implement the foregoing functions, the configuration form belongs to the protection scope of the embodiments of the invention.

Figure 11:
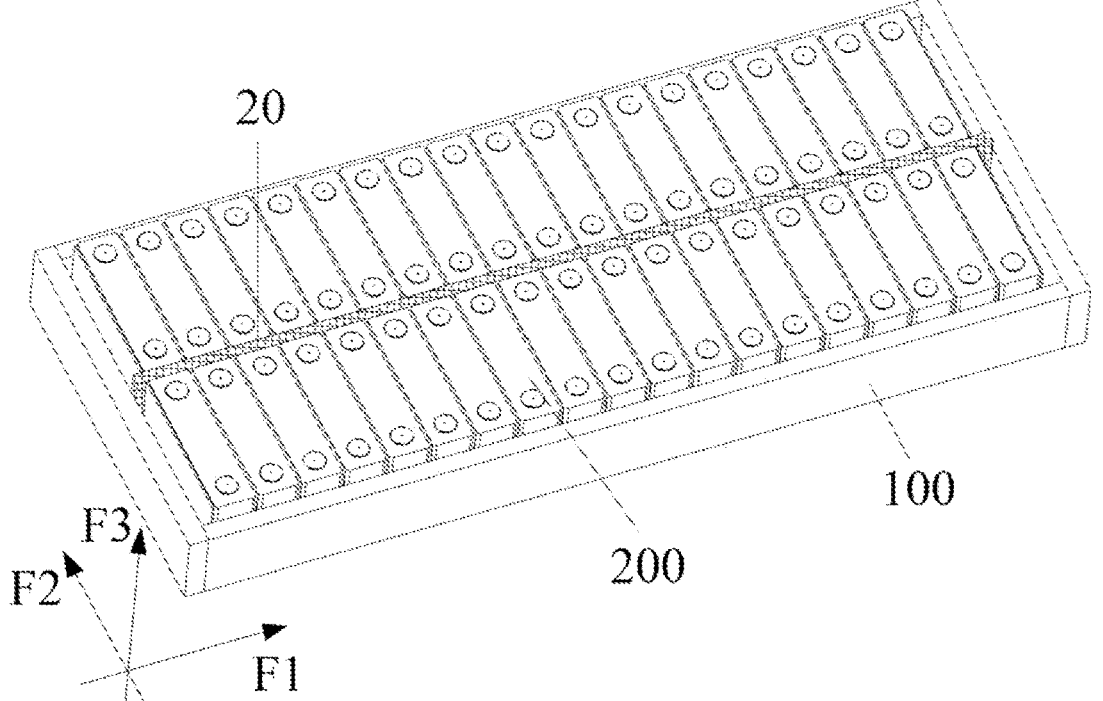
FIG. 11 is a schematic view of a structure of a battery device provided in an embodiment of the invention.

Based on the same invention concept, in an embodiment of the invention, a battery device is provided, as shown in FIG. 11. The battery device includes the battery case 100 provided in the embodiments of the invention and single batteries 200 located in the battery case 100.

Each single battery 200 may be fixed on the side surface (the left side and the right side of the intermediate beam 20 as shown in FIG. 11) of the intermediate beam 20 of the battery case 100.

In FIG. 11, the quantity of the configured single batteries 200 is not limited to what is shown in the drawing, and the quantity of the single batteries 200 can be set according to actual requirements, which is not limited to the invention.

Moreover, multiple single batteries 200 can form a battery module (as shown in FIG. 11, the single batteries 200 located on the same side of the intermediate beam 20 form a battery module), and the number of battery modules configured in the battery device is not limited to two as shown in FIG. 11 and can be plural. Specifically, the number of battery modules may be set according to actual requirements, which is not limited to the invention.

In addition, as shown in FIG. 11, in the assembly process, the single batteries 200 can be inserted into the battery case 100 along the direction F2 shown in the drawing, and the side surfaces of the single batteries 200 can be glued to the side surfaces of the intermediate beam 20, so that the single batteries 200 can be inserted into the battery case 100 from the side surfaces.

Accordingly, a large squeeze on the single battery caused by the insertion of the single battery into the battery case from the top of the battery case is prevented, thereby ensuring the performance of the single battery and preventing adverse effects on the performance of the single battery.

In some embodiments, the single batteries are glued to the side beams in the battery case.

Accordingly, the single batteries can be fixed by the side beams. When the intermediate beams can also fix the single batteries, the single batteries can be fixed at multiple angles, and thereby the single battery can be stably disposed in the battery case to prevent the abnormal situation caused by the displacement of the single battery when the battery device is in use and to improve the reliability and safety of the battery device.

In some embodiments, the battery device may further include a liquid cooling pipe, the liquid cooling pipe may be located on a side of the side beam away from the intermediate beam, and the liquid cooling pipe may not be disposed in the side beam.

Accordingly, the liquid cooling pipe can be configured according to the space in the battery case to meet the requirements in different application scenarios and improve the design flexibility, and meanwhile an overcomplicated structure of the side beam due to the configuration of the liquid cooling pipe in the side beam can be further prevented, thereby preventing the difficulty in manufacturing the battery case and the increase of the manufacturing cost.

Figure 12:
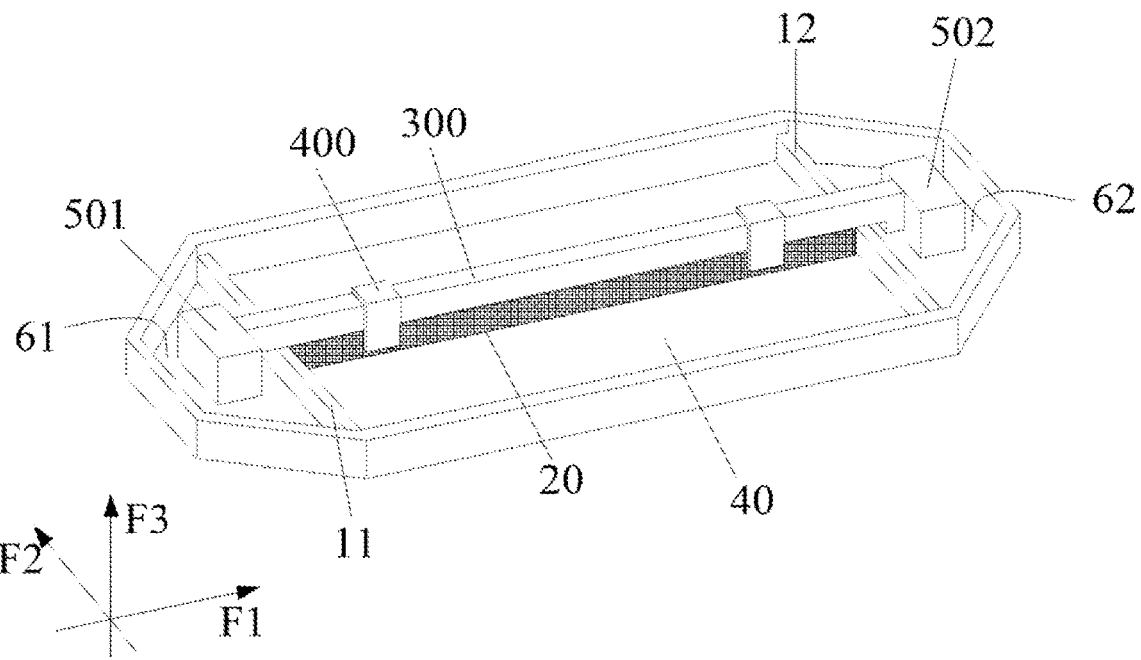
FIG. 12 is a schematic view of a structure of another battery device provided in an embodiment of the invention.

In some embodiments, as shown in FIG. 12, a conductive bar 300 and a buckle 400 are disposed on the side of the intermediate beam 20 away from the bottom plate 40, and the buckle 400 is configured to fix the conductive bar 300 on the top of the intermediate beam 20.

In FIG. 12, the single battery is not shown. As shown in FIG. 12, the conductive bar 300 may be a conductive structure disposed along the direction F1 in an extensive manner, and the conductive bar 300 may span the top (i.e., the side of the side beam away from the bottom plate 40) of the side beams (e.g., side beam 11 and side beam 12).

In addition, the number of the buckles 400 configured is not limited to two as shown in FIG. 12 and can also be set to one, three, or three or more, which can be set according to actual requirements and is not limited to the invention. Meanwhile, the specific configuration form of the buckle 400 is not limited to that shown in FIG. 12. As long as the conductive bar 300 can be fixed on the top of the intermediate beam 20, the specific configuration form of the buckle 400 is not limited to the invention.

In addition, as shown in FIG. 12, the battery device includes a battery management system 501 and a high voltage distribution box 502. The battery case 100 further includes a front end 61 of a side of the left side beam 11 away from the right side beam 12, and a rear end 62 of a side of the right side beam 12 away from the left side beam 11. The battery management system 501 may be located at the front end 61, the high voltage distribution box 502 may be located at the rear end 62, the conductive bar 300 can be configured to connect the battery management system 501 and the high voltage distribution box 502.

Structures to which the two ends of the conductive bar are connected are not limited to the battery management system and the high voltage distribution box, and the two ends of the conductive bar can also be configured to be connected to other structures or devices, which is not limited to the invention.

Moreover, the battery management system and the high voltage distribution box are not limited to be located on opposite sides (i.e., the front end and the rear end) of the battery case as shown in FIG. 12. The battery management system and the high voltage distribution box can further be located on the same side of the battery case and can be specifically configured according to actual requirements, which is not limited to the invention.

In some embodiments, the battery device may be, but is not limited to, a battery pack.

In some embodiments, in addition to the foregoing structures, the battery device may also include other structures (for example but not limited to charging and discharging ports, bus bars, flexible circuit boards, and the like) for implementing the functions of the battery device, which is not limited to the invention.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A battery case, comprising a frame and an intermediate beam, wherein the intermediate beam is disposed between two side beams disposed opposite to each other in the frame;

wherein a connecting piece is disposed on at least one end of the intermediate beam, the connecting piece fixes the intermediate beam and at least one of the side beams, and the connecting piece, the intermediate beam, and the side beams are detachably connected to each other;

the at least one end where the connecting piece is disposed is a reference end, a first groove is disposed on the side beam corresponding to the reference end, and at least part of the connecting piece is disposed in the first groove, wherein the connecting piece comprises a substrate and a protrusion protruding from a surface of the substrate;

the reference end comprises a second groove, and the protrusion is disposed in the second groove;

at least part of the substrate is disposed in the first groove, wherein the substrate comprises a body and an overlapping portion connected to each other, and the protrusion protrudes from a surface of the body;

a step is disposed in the first groove, and the overlapping portion overlaps the step and is fixed by a fastener, wherein a number of the overlapping portions is two;

the body comprises opposite two sides along an extension direction of the side beam, and the two overlapping portions are located on the opposite two sides, respectively, the battery case further comprising a bottom plate for carrying the frame;

wherein a contour of an orthographic projection of the first groove on the bottom plate is T-shaped or polygonal.

2. The battery case according to claim 1, wherein the intermediate beam and the protrusion are fixed by a fastener.

3. A battery device, comprising the battery case according to claim 2 and single batteries located in the battery case.

4. The battery case according to claim 1, wherein the entire substrate is disposed in the first groove.

5. A battery device, comprising the battery case according to claim 4 and single batteries located in the battery case.

6. The battery case according to claim 1, wherein the first groove is located on a side of the side beam away from the bottom plate;

a third groove is disposed on the side beam corresponding to the reference end, and the third groove is located on a side of the side beam facing the bottom plate;

a fastener for fixing the side beam and the connecting piece are disposed in the third groove.

7. The battery case according to claim 1, wherein a first surface of the reference end facing the side beam comprises a notch structure and a non-notch structure formed by a portion excluding the notch structure;

on a plane perpendicular to an arrangement direction of the intermediate beam and the side beams, an orthographic projection of the non-notch structure is located in an orthographic projection of the first groove;

the connecting piece comprises a substrate, and the entire substrate is disposed in the first groove;

at least part of the non-notch structure is located in the first groove.

8. The battery case according to claim 7, wherein there is the notch structure between the non-notch structure and the bottom plate;

the first groove is located on a second surface of the side beam facing the intermediate beam, and there is a gap between the notch structure and the second surface.

9. A battery device, comprising the battery case according to claim 1 and single batteries located in the battery case.

10. The battery device according to claim 9, wherein the single batteries are glued to the side beams in the battery case.

* * * * *